United States Patent
Mclaren et al.

(10) Patent No.: US 11,551,138 B2
(45) Date of Patent: Jan. 10, 2023

(54) PARALLEL PROCESSING OF REDUCTION AND BROADCAST OPERATIONS ON LARGE DATASETS OF NON-SCALAR DATA

(71) Applicant: GOOGLE LLC, Mountain View, CA (US)

(72) Inventors: Ian Moray Mclaren, Mountain View, CA (US); Norman Paul Jouppi, Palo Alto, CA (US); Clifford Hsiang Chao, Mountain View, CA (US); Gregory Michael Thorson, Waunakee, WI (US); Bjarke Hammersholt Roune, Mountain View, CA (US)

(73) Assignee: Google LLC, Mountain View, CA (US)

( * ) Notice: Subject to any disclaimer, the term of this patent is extended or adjusted under 35 U.S.C. 154(b) by 621 days.

(21) Appl. No.: 16/495,815

(22) PCT Filed: Feb. 8, 2018

(86) PCT No.: PCT/US2018/017406
§ 371 (c)(1),
(2) Date: Sep. 19, 2019

(87) PCT Pub. No.: WO2018/156358
PCT Pub. Date: Aug. 30, 2018

(65) Prior Publication Data
US 2020/0042895 A1  Feb. 6, 2020

Related U.S. Application Data

(63) Continuation of application No. 15/707,104, filed on Sep. 18, 2017, now Pat. No. 10,055,692.
(Continued)

(51) Int. Cl.
*G06F 15/173* (2006.01)
*G06N 20/00* (2019.01)

(52) U.S. Cl.
CPC ....... *G06N 20/00* (2019.01); *G06F 15/17381* (2013.01)

(58) Field of Classification Search
None
See application file for complete search history.

(56) References Cited

U.S. PATENT DOCUMENTS 6,278,997 B1  8/2001 Agrawal
6,442,694 B1  8/2002 Bergman et al.
(Continued)

FOREIGN PATENT DOCUMENTS

CN  104281853  1/2015
CN  105051693  11/2015
(Continued)

OTHER PUBLICATIONS

TW Office Action in Taiwan Application No. 107105429, dated Sep. 23, 2019, 8 pages (with English translation).
(Continued)

*Primary Examiner* — Umut Onat
(74) *Attorney, Agent, or Firm* — Fish & Richardson P.C.

(57) ABSTRACT

Methods, systems, and apparatus, including instructions encoded on storage media, for performing reduction of gradient vectors and similarly structured data that are generated in parallel, for example, on nodes organized in a mesh or torus topology defined by connections in at least two dimension between the nodes. The methods provide parallel computation and communication between nodes in the topology.

20 Claims, 4 Drawing Sheets

Combine gradient vector with the received combined gradient vector upon receipt of the combined gradient vector
410

Transmit combined gradient vector to the next processing instance
425

Related U.S. Application Data (60) Provisional application No. 62/461,758, filed on Feb. 21, 2017.

(56) References Cited

U.S. PATENT DOCUMENTS

| | | | |
|---|---|---|---|
| 10,032,091 B2* | 7/2018 | Movellan | G06V 20/30 |
| 10,055,692 B1 | 8/2018 | Mclaren et al. | |
| 10,490,094 B2* | 11/2019 | Brennan | G09B 7/02 |
| 10,621,219 B2* | 4/2020 | English | G06F 16/3344 |
| 2004/0073590 A1 | 4/2004 | Bhanot et al. | |
| 2008/0148013 A1 | 6/2008 | Jia | |
| 2013/0290223 A1 | 10/2013 | Chapelle et al. | |
| 2013/0339499 A1 | 12/2013 | George et al. | |

FOREIGN PATENT DOCUMENTS

| | | |
|---|---|---|
| CN | 105550374 | 5/2016 |
| TW | 201633193 A | 9/2016 |

OTHER PUBLICATIONS

EP Office Action in European Application No. 18157584.6, dated Apr. 28, 2020, 6 pages.

Extended European Search Report in European Application No. 21157216.9, dated Jun. 15, 2021, 11 pages.

Toldan and Kumar, "Design and Implementation of (N X N) Folded Torus Architecture for Network on Chip with E-Cube Routing," International Journal of Computer Science and Communication, Sep. 2013, 4(2):145-152.

Wang et al., An Efficient Algorithm of Frequent Itemsets Mining Based on MapReduce, May 20, 2014, Journal of Information & Computational Science; 11:8; pp. 2809-2816.

Extended European Search Report issued in European Application No. 18157584.6, dated Jun. 8, 2018, 15 pages.

International Search Report and Written Opinion issued in International Application No. PCT/US2018/017406, dated Jun. 8, 2018, 21 pages.

CN Office Action in Chinese Application No. 201810153965.2, dated Mar. 29, 2019, 10 pages.

CN Office Action in Chinese Application No. 201810153965.2, dated Aug. 27, 2019, 8 pages.

EP Office Action in European Application No. 18157584.6-1221, dated Aug. 27, 2018, 2 pages.

GB Office Action in Great Britain Application No. GB 1802758.1, dated Aug. 22, 2018, 6 pages.

TW Office Action in Taiwan Application No. 107105429, dated Dec. 20, 2018, 10 pages (with English translation).

TW Office Action in Taiwan Application No. 107105429, dated Mar. 27, 2019, 6 pages (with English translation).

PCT International Preliminary Report on Patentability in International Application No. PCT/US2018/017406, dated Sep. 6, 2019, 15 pages.

TW Office Action in Taiwan Appln. No. 110122727, dated Apr. 25, 2022, 6 pages (with English Translation).

\* cited by examiner

FIG. 5B

PARALLEL PROCESSING OF REDUCTION AND BROADCAST OPERATIONS ON LARGE DATASETS OF NON-SCALAR DATA

BACKGROUND

This specification relates to parallel processing large datasets of non-scalar data.

Machine learning models receive input and generate output based on the received input and on values of model parameters. These models often need to be trained using received inputs which are very large datasets.

SUMMARY

This specification describes technologies relating to parallel processing of large datasets in general, and specifically to parallel processing large datasets in various topologies for faster reduce, map, and broadcast operations.

In general, one innovative aspect of the subject matter described in this specification can be embodied in a method for processing training data. The method includes training a respective replica of a machine learning model on each node of a plurality of nodes organized in a torus topology comprising rows and columns of nodes, wherein each node is trained on a respective batch of training data in parallel, whereby after the training each node holds a respective gradient vector resulting from the training. The respective gradient vectors in the nodes may be combined to generate a final gradient vector by performing operations comprising: performing, by code executing on the nodes, an improved rotated pincer algorithm on the rows of the torus in parallel without doing a broadcast to generate in each row combined data for each respective disjoint field of the gradient vector, whereby when the row processing is complete, each column contains all the combined data for a respective same disjoint field of the gradient vector data; and then performing, by code executing on the nodes, a second circle algorithm in each column of the columns in the torus, including broadcasting a respective final column result in each column to all nodes in the column; and then replicating the final column results across each row of the torus, whereby each node of the torus holds the final gradient vector.

These and other embodiments can optionally include one or more of the following features. The second circle algorithm may be an improved rotated pincer algorithm. The plurality of nodes may be implemented on a single module. Each node may be implemented on a separate integrated circuit. The module may be an integrated circuit. Performing the improved rotated pincer algorithm may comprise performing the improved rotated pincer algorithm to generate summed data for each respective disjoint field of the gradient vector. The torus may consist of rows and columns of nodes. The torus topology may further comprise layers of nodes, each layer consisting of respective rows and columns of nodes. Performing the improved rotated pincer algorithm on each row may comprise, for each node in each row: using the node as the starting node of an instantiation of the improved pincer algorithm that sends half of the disjoint field of the node to each of the two adjacent nodes in the circle of the row; and performing the improved pincer algorithm starting at the node.

For each starting node in the row, each finishing node opposite the starting node may broadcast the final field gradient vector determined by the finishing node to the other nodes in the row. The combining may be performed along the columns in parallel with the combining along the rows of the torus, with each node in each row being a starting node in the row and each node in each column being a starting node in the column, and each starting node processing a distinct respective disjoint field of the gradient vector.

In some implementations, a method for processing training data may include training a respective replica of a machine learning model on each node of a plurality of nodes organized in a torus topology comprising rows and columns of nodes, wherein each node is trained on a respective batch of training data in parallel, whereby after the training each node holds a respective gradient vector resulting from the training; combining the respective gradient vectors in the nodes to generate a final gradient vector by performing operations comprising: performing, by code executing on the nodes, a respective circle reduction along each row of the torus, resulting in each node in each row having a reduced vector for every gradient vector originally in the nodes of the row; and performing, by code executing on the nodes, a respective circle reduction along each column of the torus, at the end of which each node holds the same final gradient vector.

These and other embodiments can optionally include one or more of the following features. The circle reductions can be performed using a rotated pincer algorithm.

In some implementations, the method for processing training data may include: training respective replica of a machine learning model on each node on a module of nodes organized in a topology made up of circular rows with wrap-around links and non-circular columns of nodes without wrap-around links, wherein each node is trained on a respective batch of training data in parallel, whereby after the training each node holds a respective gradient vector resulting from the training; combining the respective gradient vectors in the nodes to generate a final gradient vector by performing operations comprising: performing, by code executing on the nodes, a respective circle reduction along each row of the topology, resulting in each node in each row having a reduced vector for every gradient vector originally in the nodes of the row; and performing, by code executing on the nodes, a respective line reduction along each column of the torus, at the end of which each node holds the same final gradient vector.

In some implementations, the method for processing training data includes: storing a distinct batch of data on each node of a plurality of nodes organized in a torus topology comprising rows and columns of nodes; combining the respective batches of data in the nodes to generate a final batch of data by performing operations comprising: performing, by code executing on the nodes, a respective circle reduction along each row of the torus, resulting in each node in each row having a combined batch of data vector for every batch of data originally in the nodes of the row; and performing, by code executing on the nodes, a respective circle reduction along each column of the torus, at the end of which each node holds the same final combined batch of data.

These and other embodiments can optionally include one or more of the following features. Each circle reduction along the rows and columns of the torus may be performed by code implementing an improved rotated pincer algorithm. The combining may be a reducing of the batches of data.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

Another implementation of the disclosure includes a method for performing reduction of gradient vectors and similarly structured data that are generated in parallel, for example, on nodes organized in a mesh or torus topology defined by connections in at least two dimension between the nodes. The methods provide parallel computation and communication between nodes in the topology.

In some embodiments a machine-readable storage medium, for example a non-transitory machine-readable storage medium, stores instructions which, when executed, cause a processing device to perform operations comprising a method according to any embodiment or aspect described herein.

In some embodiments a system comprises: a memory; and a processing device operatively coupled with the memory to perform operations comprising a method according to any embodiment or aspect described herein.

The above described embodiments form alternative solutions for improving the training of a machine learning model by processing the training data in the respective manner based on the topology in which the plurality of nodes are organized.

BRIEF DESCRIPTION OF THE DRAWINGS

Like reference numbers and designations in the various drawings indicate like elements.

DETAILED DESCRIPTION

Figure 1:
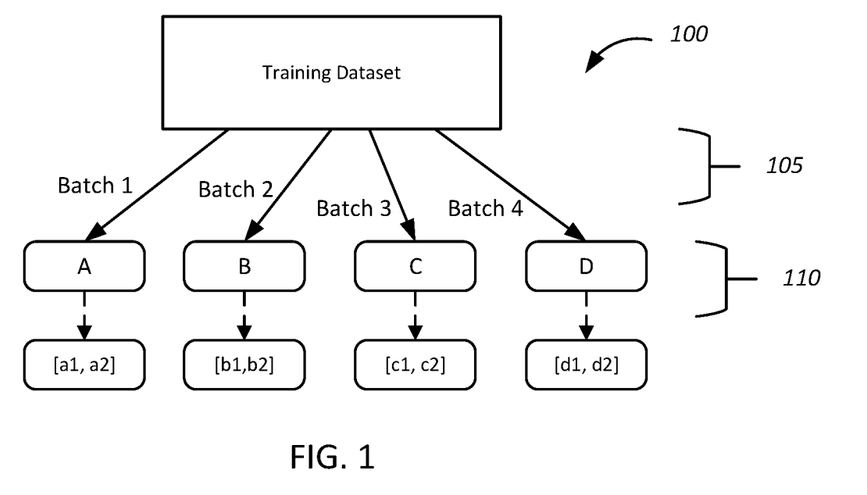
FIG. 1 illustrates an example system of machine learning model replicas.

One common strategy for training a machine learning model is to process batches of training data in parallel on multiple processing units. FIG. 1 illustrates an example system 100 of machine learning model replicas A-D each being trained on a corresponding processing unit 110. For convenience, the replicas and the processing units on which they are found may both be referred to by the same designation in the figures.

When trained, a machine learning model is defined by values of the model parameters. The model parameters are generally organized as non-scalar data, e.g., as a vector, a two-dimensional (2D) matrix, a three-dimensional (3D) matrix, or a matrix of higher degree, whose elements are generally scalar values, e.g., integers or floating point numbers.

In the system, each replica is trained on a unique batch of training data. In FIG. 1, replicas A-D are trained on batches 1-4 105 respectively. When a replica has finished processing its batch of training data, the replica has a set of gradients for the values of the model parameters. The structure of the gradient values in each replica is the same and generally corresponds to the structure of the parameter values. For convenience, these will both be referred to as vectors.

Because the replicas are trained on different data, the gradient vectors of the replicas are combined to generate a final gradient vector, which is used to update the parameter values, i.e., the parameter vector, of the model. One way to combine the gradient vectors is to generate an element-wise average. The updated parameter values are communicated to all machine learning model replicas, generally in anticipation of another iteration of processing a batch of training data and combining, i.e., reducing, the gradient vectors of each replica to a reduced, i.e., final gradient vector and updating the parameter values of the model.

Some machine learning systems have a central parameter computation subsystem that receives the gradient vectors from each replica and combines them at a central location. This specification describes technologies that can be used in machine learning systems that do not have a central parameter computation subsystem and instead reduce gradient vectors and update parameter values in a distributed fashion in the replicas.

Figure 2:
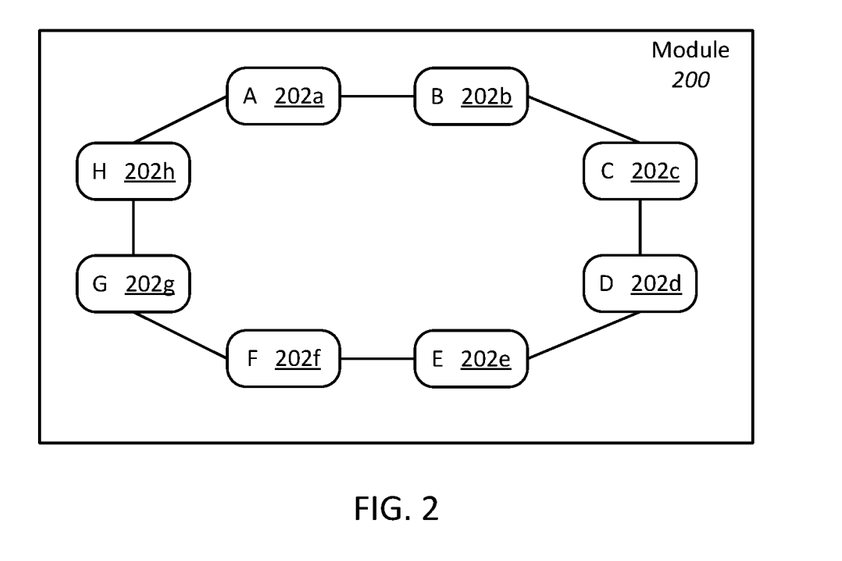
FIG. 2 illustrates an example of processing units connected in a circular topology on an example module.

FIG. 2 illustrates the topology of high-speed connections connecting an example assemblage of processing units A-H (202a-202h) connected in a circular topology. Advantageously, all the processing units are on a single module 200. The lines shown in the figure between the processing units represent high-speed data communication links. The processing units are advantageously manufactured on one integrated circuit ("chip") but they can also be manufactured on multiple chips. Across chip boundaries the links are inter-chip network links; processing units on the same chip communicate over intra-chip interface links. The links may be half-duplex links on which only one processing unit can transmit data at a time or full-duplex links on which data can be transmitted in both directions simultaneously.

Methods for performing a reduction in this topology will now be described in reference to processing units A-H. The reduction has a summing step, a compute step and a broadcast step.

Single-Path Algorithm

The single-path algorithm has one of the processing units, e.g., unit A, send data to one neighbor, e.g., unit B. B adds the data from A to its own data and sends the sum to C and so on. This sending and processing of data is advantageously done in a streaming fashion so that, for example, B can start adding before it has received all the data from A. The final combination occurs in unit H. The final gradient vector is then communicated to the other units. This can be done by reversing the streaming data path. Alternatively, if broadcast functionality is available to the processing units that allows one unit to broadcast to multiple units, communication of the final gradient vector can be done using the broadcast functionality. For convenience, this part of the process will be referred to as a broadcast even though each processing unit may only communicate the final output to one other processing unit.

Pincer Algorithm

To realize lower latency than that of the single-path algorithm, the pincer algorithm sends the data across two paths in opposite directions on the circle. Thus, for example, units A and B start communicating at the same time so that F and E end up with the sum across the path leading to them from A and B, respectively. If the number of units is even, then the data has to be transferred from F to E or vice versa and combined there before it is broadcast to all the units.

Rotated Pincer Algorithm

The rotated pincer algorithm described below reduces the latency further.

In the rotated pincer algorithm, independent instantiations of the pincer algorithm are performed simultaneously, starting from every pair of adjacent processing units. Thus, while the pincer algorithm is running starting from units A and B, the same algorithm is running starting from units B and C, and from C and D, and so on.

The gradient vector is partitioned into disjoint subsets of equal size, if possible, or essentially equal size, and each of the instantiations of the algorithm handles one of those subsets. This may change how streaming works, because now B, for example, will be sending one subset of data to C while C is sending another subset of data to D. So C will not be forwarding data from B until it is done sending out its own data. To do this, the data transmitted from B to C is stored temporarily on C. Alternatively, the processing of data arriving at C from B and D may be interleaved.

Improved Rotated Pincer Algorithm

The improved rotated pincer algorithm described below reduces the latency further if the number of nodes is even.

In the improved rotated pincer algorithm, unit A first sends half its data to unit H and the other half to B and then the pincer algorithm continues as normal. That makes the data path symmetric in the two directions. For broadcast in this algorithm, if unit E, for example, wants to broadcast to all other nodes, it sends the data in the reverse direction and, as the final step, units B and H send disjoint halves of the data to A, so that A still receives all the data.

Gradient Reduction on a Torus

Figure 3:
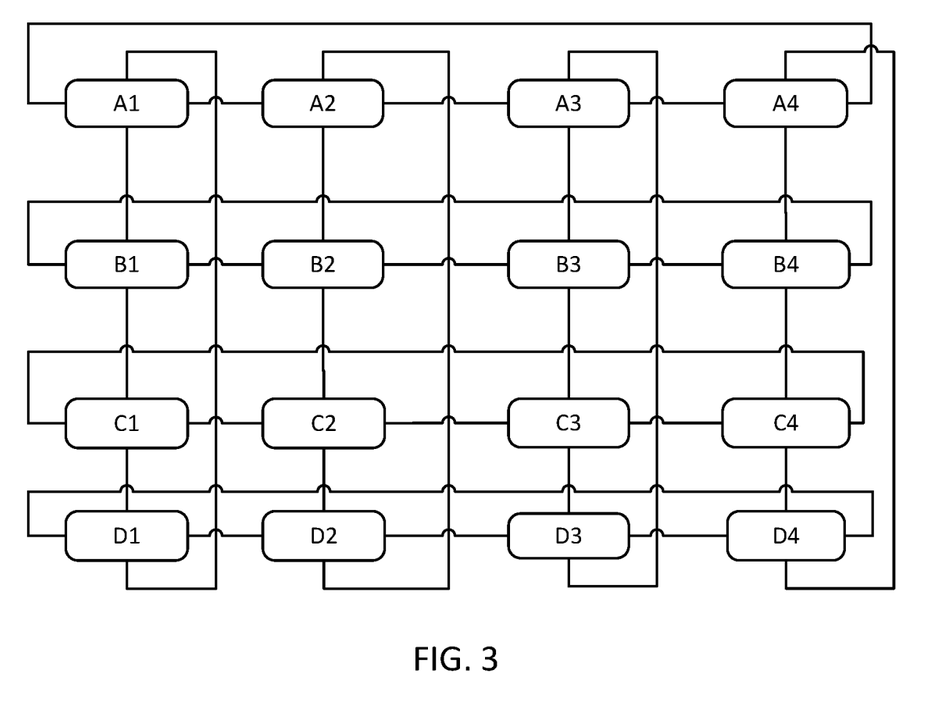
FIG. 3 illustrates a torus topology of replicas and processing units.

FIG. 3 illustrates a torus topology of replicas and processing units. Illustrated for convenience are sixteen replicas and processing units A1 through D4, each of which is part of two circles of four units, a horizontal one and a vertical one, and each of which has direct links to four other units. A topology for processing large machine learning models, e.g., models with 10, 25, or 50 million parameter values, a suitable number of processing units would be larger, for example, 16 units in each circle and 256 units in all. Larger or smaller numbers would be suitable for larger or smaller models.

Iterative Reduction Algorithm

The iterative reduction algorithm on a torus simplifies reduction on a torus to a series of reductions on circles. The first step is to do a circle reduction along each of the rows, using for the A row only links A1-A2, A2-A3, A3-A4, and A4-A1.

First, any of the circle reduction algorithms described above is performed in each row, resulting in the units in a row each having a sum vector for every gradient vector originally in the units of the row.

Then, a circle reduction is performed along each of the columns, at the end of which the same final gradient vector is in every unit.

As disclosed above, a reduction has a summing step, a compute step, and a broadcast step. The initial row-circle reductions should not perform a complete compute step because the gradients have not actually finished summing on the torus, even if the computation on the circle has completed.

Rotated Iterative Reduction Algorithm

An improvement on the iterative reduction algorithm is the rotated iterative reduction algorithm, in which the same algorithm is instantiated twice, rotated 90 degrees in parallel on half the data. One instantiation processes rows and then columns and the rotated instantiation processes columns and then rows. The two instantiations never use the same communication link at the same time, so this doubles the bandwidth utilization of the links of the torus.

Recursive Reduction Algorithm

Further improvement is realized in the recursive reduction algorithm. In this algorithm, first the improved rotated pincer algorithm is performed on the rows of the torus without doing the broadcast where the summed data is updated and sent to the other units in the row. This way, each unit has summed data for a disjoint subset of the gradient vector. As a result, when the row processing is complete, each column contains all the data for the same subset of the gradient vector data.

Then a second circle reduction is performed along the columns, including updating the weights and broadcasting the result to all units in the column. To complete the reduction, the recursive reduction algorithm process replicates the data across each row. This provides an optimal broadcast on the row-circle.

Comparing the algorithms in terms of the amount of data N and the number of processing units in a row of the torus C, the recursive reduction algorithm in effect runs a row reduction on N data and a column reduction on N/C data, compared to a column reduction on N data for the iterative algorithm.

Rotated Recursive Reduction Algorithm

The recursive reduction algorithm can be rotated and duplicated in the same way as described above for the rotated iterative reduction algorithm to double the use of the link bandwidth to a theoretically optimal amount. This is because this algorithm only sends data that needs to be sent and it saturates all the links in both directions until it is done.

Alternative Topologies

The algorithms described in this specification can basically be used on other topologies as well, for example, in a 16×4 topology in which there are wrap-around links in the dimension with 16 units but not in the dimension with 4 units. The algorithms would be modified to use circle reduction in the dimension with wrap-around links and some form of line reduction, e.g., the single-path algorithm described above, in the dimension without wrap-around links. Similarly, the algorithms can be modified to work on a mesh topology, which has no wrap-around links.

Implementation of Algorithms

Each of the algorithms can be implemented in a distributed way by processes or threads running on the processing units.

The processes can be configured by control messages, for example, that indicate for each reduction instantiation which subset of the gradient vector the process is to handle, whether it is a starting unit, final unit, or intermediate unit in the reduction, and in which direction the data or combined data and the broadcasts should be sent, as described above.

Programming for Gradient Reduction Process Operations

Figure 4A:
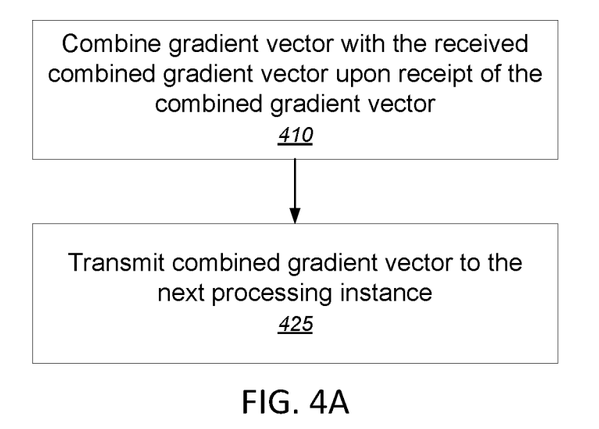
FIG. 4A is a flow diagram that illustrates processing performed by intermediate processing units.

FIG. 4A is a flow diagram that illustrates the process performed by each intermediate processing unit. Each intermediate processing unit combines its gradient vector or a portion of its gradient vector with the input gradient vector it received upon receipt of portion of an input gradient vector from a previous processing unit (410). The combining operation performed by each processing unit can be a simple sum or some other computation that combines the gradient vectors. The intermediate processing unit then transmits the combined gradient vector to the next processing unit in the direction of the data path (425).

Figure 4B:
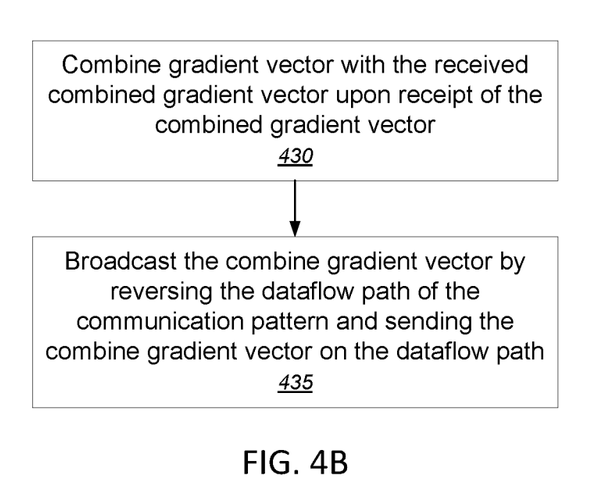
FIG. 4B is a flow diagram that illustrates processing performed by final processing units.

FIG. 4B is a flow diagram that illustrates the process performed by each final processing unit. A final processing unit combines its gradient vector with the input gradient vector it received upon receipt of an input gradient vector from a previous processing unit in the direction of the data path and generates a final reduced gradient vector (430).

The final processing unit will generally combine the reduced gradient vector with the values of the machine learning model parameters to produce an updated set of parameter values (432). Assuming a vector of parameters x and the gradient dx, a simple update has the form: x+=−learning_rate*dx, where the learning_rate is a scalar term. The update rules can be arbitrarily complicated, e.g., they can depend on previous gradients. After calculating the updated parameters, the final processing unit initiates a broadcast operation that provides the updated parameter values to all other processing units by reversing the flow of the data sending the final output through the processing units in the direction all the way back to the root processing unit (435). As a result, each of the processing units will have the updated parameters to use in processing the next batch of machine learning training data.

This process will be referred to as a broadcast process even though each processing unit only communicates the final output to one other processing unit.

Figure 5A:
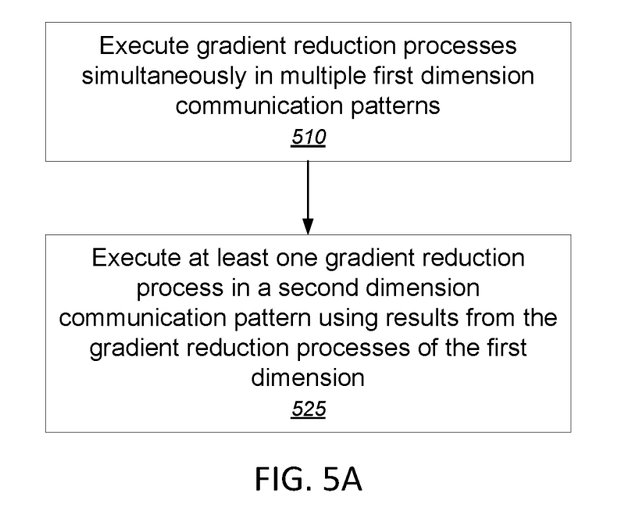
FIG. 5A is a flow diagram that illustrates processing performed by processing units in a two-dimensional (2D) mesh or torus topology.

FIG. 5A is a flow diagram that illustrates processing performed by processing units in a two-dimensional (2D) mesh or torus topology. These processing units execute gradient reduction processes simultaneously in multiple first dimension data paths (510). Then processing units of the 2D mesh or torus execute at least one gradient reduction process in a second dimension data path using results from the gradient reduction processes of the first dimension (525).

Figure 5B:
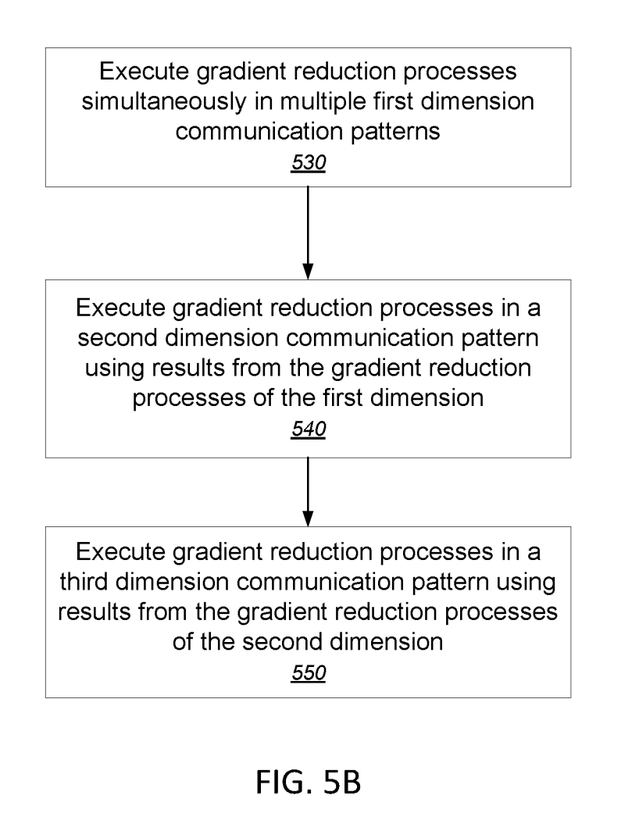
FIG. 5B is a flow diagram that illustrates processing performed by processing units in a three-dimensional (3D) mesh or torus.

FIG. 5B is a flow diagram that illustrates processing performed by processing units in a three-dimensional (3D) mesh or torus topology. These processing units execute gradient reduction processes simultaneously in multiple first dimension data paths (530). Then processing units of the 3D mesh or torus execute multiple gradient reduction processes in second dimension data paths using results from the gradient reduction processes of the first dimension (540). Finally, the processing units of the 3D mesh or torus execute at least one gradient reduction process in a third dimension data path using results from the gradient reduction processes of the second dimension (1050).

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on instance data and generating output. Although the specification specifically refers to processing units processing gradient vectors, processing units can process perform reduction processing on any non-scalar instance data, i.e., tensors, matrices, arrays, or any other data structure that can hold data that can be sharded and processed in parallel. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Embodiment 1 is a method for processing training data, the method comprising:
 training a respective replica of a machine learning model on each node of a plurality of nodes organized in a torus topology comprising rows and columns of nodes, wherein each node is trained on a respective batch of training data in parallel, whereby after the training each node holds a respective gradient vector resulting from the training;
 combining the respective gradient vectors in the nodes to generate a final gradient vector by performing operations comprising:
  performing, by code executing on the nodes, an improved rotated pincer algorithm on the rows of the torus in parallel without doing a broadcast to generate in each row combined data for each respective disjoint field of the gradient vector, whereby when the row processing is complete, each column contains all the combined data for a respective same disjoint field of the gradient vector data; and then
  performing, by code executing on the nodes, a second circle algorithm in each column of the columns of the torus, including broadcasting a respective final column result in each column to all nodes in the column; and then
  replicating the final column results across each row of the torus, whereby each node of the torus holds the final gradient vector.

Embodiment 2 is the method of embodiment 1, wherein the second circle algorithm is an improved rotated pincer algorithm.

Embodiment 3 is the method of any one of embodiments 1-2, wherein the plurality of nodes are implemented on a single module.

Embodiment 4 is the method of any one of embodiments 1-3, wherein each node is implemented on a separate integrated circuit.

Embodiment 5 is the method of any one of embodiments 1-4, wherein the module is an integrated circuit.

Embodiment 6 is the method of any one of embodiments 1-5, wherein performing the improved rotated pincer algorithm comprises performing the improved rotated pincer algorithm to generate summed data for each respective disjoint field of the gradient vector.

Embodiment 7 is the method of any one of embodiments 1-6, wherein the torus consists of the rows and columns of nodes.

Embodiment 8 is the method of any one of embodiments 1-7, wherein the torus topology further comprises layers of nodes, each layer consisting of respective rows and columns of nodes.

Embodiment 9 is the method of any one of embodiments 1-8, wherein performing the improved rotated pincer algorithm on each row comprises:
for each node in each row:
using the node as the starting node of an instantiation of the improved pincer algorithm that sends half of the disjoint field of the node to each of the two adjacent nodes in the circle of the row; and
performing the improved pincer algorithm starting at the node.

Embodiment 10 is the method of any one of embodiments 1-9, further comprising:
for each starting node in the row, broadcasting, by each finishing node opposite the starting node, the final field gradient vector determined by the finishing node to the other nodes in the row.

Embodiment 11 is the method of any one of embodiments 1-10, further comprising:
performing the combining along the columns in parallel with the combining along the rows of the torus, with each node in each row being a starting node in the row and each node in each column being a starting node in the column, and each starting node processing a distinct respective disjoint field of the gradient vector.

Embodiment 12 is method for processing training data, the method comprising:
training a respective replica of a machine learning model on each node of a plurality of nodes organized in a torus topology comprising rows and columns of nodes, wherein each node is trained on a respective batch of training data in parallel, whereby after the training each node holds a respective gradient vector resulting from the training;
combining the respective gradient vectors in the nodes to generate a final gradient vector by performing operations comprising:
performing, by code executing on the nodes, a respective circle reduction along each row of the torus, resulting in each node in each row having a reduced vector for every gradient vector originally in the nodes of the row; and
performing, by code executing on the nodes, a respective circle reduction along each column of the torus, at the end of which each node holds the same final gradient vector.

Embodiment 13 is the method of embodiment 12, wherein the circle reductions are performed using a rotated pincer algorithm.

Embodiment 14 is a method for processing training data, the method comprising:
training respective replica of a machine learning model on each node on a module of nodes organized in a topology made up of circular rows with wrap-around links and non-circular columns of nodes without wrap-around links, wherein each node is trained on a respective batch of training data in parallel, whereby after the training each node holds a respective gradient vector resulting from the training;
combining the respective gradient vectors in the nodes to generate a final gradient vector by performing operations comprising:
performing, by code executing on the nodes, a respective circle reduction along each row of the topology, resulting in each node in each row having a reduced vector for every gradient vector originally in the nodes of the row; and
performing, by code executing on the nodes, a respective line reduction along each column of the torus, at the end of which each node holds the same final gradient vector.

Embodiment 15 is a method for processing training data, the method comprising:
storing a distinct batch of data on each node of a plurality of nodes organized in a torus topology comprising rows and columns of nodes;
combining the respective batches of data in the nodes to generate a final batch of data by performing operations comprising:
performing, by code executing on the nodes, a respective circle reduction along each row of the torus, resulting in each node in each row having a combined batch of data vector for every batch of data originally in the nodes of the row; and
performing, by code executing on the nodes, a respective circle reduction along each column of the torus, at the end of which each node holds the same final combined batch of data.

Embodiment 16 is the method of embodiment 15, wherein each circle reduction along the rows and columns of the torus is performed by code implementing an improved rotated pincer algorithm Embodiment 17 is the method of any of the embodiments 15 or 16, wherein the combining is a reducing of the batches of data.

Embodiment 18 is a system comprising:
a plurality of nodes organized in a topology of rows and columns and one or more storage devices on which are stored instructions that are operable, when executed by the nodes, to cause the nodes to perform the method of any one of embodiments 1-17.

Embodiment 19 is the system of one of embodiment 18, wherein the nodes are organized in a torus topology.

Embodiment 20 is the system of any of one of embodiments 18 or 19, wherein the nodes are organized in a torus topology on a module.

Embodiment 21 is a storage medium encoded with instructions that are operable, when executed by nodes organized in a topology of rows and columns, to cause the nodes to perform the method of any one of embodiments 1-17.

Embodiment 22 is the storage medium of embodiment 21, wherein the storage medium is one or more non-transitory storage devices.

Embodiment 23 is the storage medium of any one of embodiments 21 or 22, wherein the nodes are organized in a torus topology.

While this specification contains many specific implementation details, these should not be construed as limitations on the scope of any invention or on the scope of what may be claimed, but rather as descriptions of features that may be specific to particular embodiments of particular inventions. In this specification, the terms "vector," "vector data," and "vector elements" are used broadly to refer to any non-scalar data. In addition to vectors examples of non-scalar data are strings, arrays, structs, matrices, and tensors.

The reduce and update functions described in this specification are merely examples and entirely independent of the invention itself. Additionally, the invention is described as being used for machine learning, but can be used for any purpose that involves reducing data that is distributed across a network.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

training a machine learning model on batches of training data by processing each batch on a corresponding computational node of a plurality of nodes that are interconnected according to a network topology that comprises rows of nodes and columns of nodes, wherein each node is in exactly one of the rows and one of the columns, wherein one node in each row of nodes is designated as a starting node of the row and one node in each row of nodes is designated as a finishing node of the row, wherein each row has an even number of nodes connected in a row circle, wherein the finishing node of the row is opposite the starting node of the row on the row circle, wherein a next adjacent node for processing is designated for each node of the row other than the finishing node of the row, the next adjacent node for processing of the row being the adjacent node on the row circle that is closer to the finishing node of the row than said each node of the row, wherein a preceding adjacent node for processing is designated for each node of the row other than the starting node of the row, the preceding adjacent node for processing of the row being the adjacent node on the row circle that is closer to the starting node of the row than said each node of the row, wherein training the machine learning model comprises executing code by each node to cause each node of the plurality of nodes to process a respective batch of training data through a respective replica of the machine learning model to obtain respective replica gradient data;

generating final gradient data from respective replica gradient data of each node of the plurality of nodes, comprising:

for each row of the network topology:

sending, by a respective starting node for the row, (i) a first half of replica gradient data obtained by the respective starting node to a first adjacent node in the row connected to the starting node, and (ii) the remainder of the replica gradient data obtained by the starting node to a second adjacent node in the row connected to the starting node, combining, by each node in the row other than the starting node of the row, gradient data from the preceding adjacent node of the node with replica gradient data obtained by the node, sending, by each node in the row other than the finishing node, the respective combined gradient data on the node to a next adjacent node of the node in the row, and determining, by the finishing node of the row, that the finishing node has combined the gradient data received from its two adjacent nodes in the row, and in response, broadcasting, by the finishing node, the respective intermediate gradient data to each other node in the row, and then computing, by each column of the network topology and from the respective intermediate gradient data of each node in the column, the final gradient data; and broadcasting the final gradient data to each node in the plurality of nodes.

2. The method of claim 1, wherein one node in each column of nodes is designated as a starting node of the column and one node in each column of nodes is designated as a finishing node of the column, wherein each column has an even number of nodes connected in a column circle, wherein the finishing node of the column is opposite the starting node of the column on the column circle, wherein a next adjacent node for processing is designated for each node of the column other than the finishing node of the column, the next adjacent node for processing of the column being the adjacent node on the column circle that is closer to the finishing node of the column than said each node of the column, wherein a preceding adjacent node for processing is designated for each node of the column other than the starting node of the column, the preceding adjacent node for processing of the column being the adjacent node on the column circle that is closer to the starting node of the column than said each node of the column, and wherein computing, by each column of the network topology and from the respective intermediate gradient data of each node in the column, the final gradient data comprises:

sending, by a starting node for the column, (i) a first half of intermediate gradient data obtained by the respective starting node to a first adjacent node in the column connected to the starting node, and (ii) the remainder of the intermediate gradient data obtained by the starting node to a second adjacent node in the column connected to the starting node, combining, by each node in the column other than the starting node of the column, gradient data from the preceding adjacent node of the node with intermediate gradient data obtained by the node, sending, by each node in the column other than the finishing node, the respective combined intermediate data on the node to a next adjacent node of the node in the column; and wherein broadcasting the final gradient data to each node in the plurality of nodes comprises determining, by the finishing node of each column, that the finishing node has combined the gradient data received from its two adjacent nodes in the column, and in response, broadcasting, by the finishing node, the combined intermediate gradient data to each other node in the column, wherein the combined intermediate gradient data is the final gradient data.

3. The method of claim 1, wherein respective replica gradient data for each node comprises a respective gradient vector comprising a plurality of elements, and wherein combining, by each node in the row other than the starting node of the row, the gradient data from the preceding adjacent node of the node with the replica gradient data obtained by the node comprises performing an element-wise average of elements of a gradient vector of the gradient data from the preceding adjacent node of the node with elements of a gradient vector of the replica gradient data obtained by the node.

4. The method of claim 1, wherein sending, by the starting node for the row, (i) the first half of the replica gradient data obtained by the respective starting node to the first adjacent node in the row connected to the starting node, and (ii) the remainder of the replica gradient data obtained by the starting node to the second adjacent node in the row connected to the starting node comprises:

streaming, by the starting node for the row, the replica gradient data to the first adjacent node and the second adjacent node; and wherein sending, by each node other than the finishing node, the respective combined gradient data on the node to the next adjacent node of the node comprises streaming, by each node, the respective combined gradient data on the node to the next adjacent node of the node.

5. The method of claim 4, wherein combining, by each node in the row other than the starting node, the gradient data from the preceding adjacent node of the node.

6. The method of claim 1, wherein the plurality of nodes are implemented on a single module.

7. The method of claim 6, wherein the single module is an integrated circuit.

8. The method of claim 1, wherein each node comprises one or more processing units and one or more non-transitory computer-readable storage media.

9. The method of claim 1, wherein the network topology is a three-dimensional torus topology.

10. A system comprising:

one or more processing units;

one or more storage devices;

a plurality of nodes implemented on the one or more processing units and the one or more storage devices, wherein the plurality of nodes are interconnected according to a network topology that comprises rows of nodes and columns of nodes, wherein the rows comprise wrap-around links, wherein each node is in exactly one of the rows and one of the columns, wherein one node in each row of nodes is designated as a starting node of the row and one node in each row of nodes is designated as a finishing node of the row, wherein each row has an even number of nodes connected in a row circle, wherein the finishing node of the row is opposite the starting node of the row on the row circle, wherein a next adjacent node for processing is designated for each node of the row other than the finishing node of the row, the next adjacent node for processing of the row being the adjacent node on the row circle that is closer to the finishing node of the row than said each node of the row, wherein a preceding adjacent node for processing is designated for each node of the row other than the starting node of the row, the preceding adjacent node for processing of the row being the adjacent node on the row circle that is closer to the starting node of the row than said each node of the row, and wherein the one or more storage devices store media encoded with instructions that, when executed by one or more computers, cause the one or more computers to perform operations comprising:

training a machine learning model on batches of training data by processing each batch on a corresponding computational node of a plurality of nodes, comprising executing code by each node to cause each node of the plurality of nodes to process a respective batch of training data through a respective replica of the machine learning model to obtain respective replica gradient data;

generating final gradient data from respective replica gradient data of each node of the plurality of nodes, comprising:

for each row of the network topology:

sending, by a respective starting node for the row, (i) a first half of replica gradient data obtained by the respective starting node to a first adjacent node in the row connected to the starting node, and (ii) the remainder of the replica gradient data obtained by the starting node to a second adjacent node in the row connected to the starting node, combining, by each node in the row other than the starting node of the row, gradient data from the preceding adjacent node of the node with replica gradient data obtained by the node, sending, by each node in the row other than the finishing node, the respective combined gradient data on the node to a next adjacent node of the node in the row, and determining, by the finishing node of the row, that the finishing node has combined the gradient data received from its two adjacent nodes in the row, and in response, broadcasting, by the finishing node, the respective intermediate gradient data to each other node in the row, and then computing, by each column of the network topology and from the respective intermediate gradient data of each node in the column, the final gradient data; and broadcasting the final gradient data to each node in the plurality of nodes.

11. The system of claim 10, wherein the columns comprise wrap-around links.

12. The system of claim 11, wherein one node in each column of nodes is designated as a starting node of the column and one node in each column of nodes is designated as a finishing node of the column, wherein each column has an even number of nodes connected in a column circle, wherein the finishing node of the column is opposite the starting node of the column on the column circle, wherein a next adjacent node for processing is designated for each node of the column other than the finishing node of the column, the next adjacent node for processing of the column being the adjacent node on the column circle that is closer to the finishing node of the column than said each node of the column, wherein a preceding adjacent node for processing is designated for each node of the column other than the starting node of the column, the preceding adjacent node for processing of the column being the adjacent node on the column circle that is closer to the starting node of the column than said each node of the column, and     wherein computing, by each column of the network topology and from the respective intermediate gradient data of each node in the column, the final gradient data comprises:

sending, by a starting node for the column, (i) a first half of intermediate gradient data obtained by the respective starting node to a first adjacent node in the column connected to the starting node, and (ii) the remainder of the intermediate gradient data obtained by the starting node to a second adjacent node in the column connected to the starting node,         combining, by each node in the column other than the starting node of the column, gradient data from the preceding adjacent node of the node with intermediate gradient data obtained by the node,         sending, by each node in the column other than the finishing node, the respective combined intermediate data on the node to a next adjacent node of the node in the column; and     wherein broadcasting the final gradient data to each node in the plurality of nodes comprises determining, by the finishing node of each column, that the finishing node has combined the gradient data received from its two adjacent nodes in the column, and in response, broadcasting, by the finishing node, the combined intermediate gradient data to each other node in the column, wherein the combined intermediate gradient data is the final gradient data.

13. The system of claim 10, wherein the rows and columns of nodes are rows and columns of a layer of a plurality of layers interconnected according to the network topology.

14. The system of claim 10, wherein the network topology is a three-dimensional torus topology.

15. The system of claim 10, wherein the batches of training data are first batches of training data, and wherein the operations further comprising after broadcasting the final gradient data to each node in the plurality of nodes:

updating, by each node, model parameter values for the machine learning model using the final gradient data, and     training the machine learning model on second batches of training data.

16. The system of claim 10, wherein the plurality of nodes are implemented on a single module.

17. The system of claim 16, wherein the single module is an integrated circuit.

18. The system of claim 10, wherein sending, by the starting node for the row, (i) the first half of the replica gradient data obtained by the respective starting node to the first adjacent node in the row connected to the starting node, and (ii) the remainder of the replica gradient data obtained by the starting node to the second adjacent node in the row connected to the starting node comprises:

streaming, by the starting node for the row, the replica gradient data to the first adjacent node and the second adjacent node; and     wherein sending, by each node other than the finishing node, the respective combined gradient data on the node to the next adjacent node of the node comprises streaming, by each node, the respective combined gradient data on the node to the next adjacent node of the node.

19. The system of claim 18, wherein combining, by each node in the row other than the starting node, the gradient data from the preceding adjacent node of the node with the replica gradient data obtained by the node comprises combining the gradient data from the preceding adjacent node of the node as the replica gradient data is streamed into the node.

20. One or more non-transitory computer-readable storage media encoded with instructions that are executable by one or more processing units implementing a plurality of nodes, wherein the plurality of nodes are interconnected according to a network topology that comprises rows of nodes and columns of nodes, wherein the rows comprise wrap-around links, wherein each node is in exactly one of the rows and one of the columns, wherein one node in each row of nodes is designated as a starting node of the row and one node in each row of nodes is designated as a finishing node of the row, wherein each row has an even number of nodes connected in a row circle, wherein the finishing node of the row is opposite the starting node of the row on the row circle, wherein a next adjacent node for processing is designated for each node of the row other than the finishing node of the row, the next adjacent node for processing of the row being the adjacent node on the row circle that is closer to the finishing node of the row than said each node of the row, wherein a preceding adjacent node for processing is designated for each node of the row other than the starting node of the row, the preceding adjacent node for processing of the row being the adjacent node on the row circle that is closer to the starting node of the row than said each node of the row, and     wherein the instructions, when executed by the one or more processing units, cause the one or more processing units to perform operations comprising:

training a machine learning model on batches of training data by processing each batch on a corresponding computational node of a plurality of nodes, comprising executing code by each node to cause each node of the plurality of nodes to process a respective batch of training data through a respective replica of the machine learning model to obtain respective replica gradient data;

generating final gradient data from respective replica gradient data of each node of the plurality of nodes, comprising:

for each row of the network topology:

sending, by a respective starting node for the row, (i) a first half of replica gradient data obtained by the respective starting node to a first adjacent node in the row connected to the starting node, and (ii) the remainder of the replica gradient data obtained by the starting node to a second adjacent node in the row connected to the starting node,             combining, by each node in the row other than the starting node of the row, gradient data from the preceding adjacent node of the node with replica gradient data obtained by the node, sending, by each node in the row other than the finishing node, the respective combined gradient data on the node to a next adjacent node of the node in the row, and determining, by the finishing node of the row, that the finishing node has combined the gradient data received from its two adjacent nodes in the row, and in response, broadcasting, by the finishing node, the respective intermediate gradient data to each other node in the row, and then computing, by each column of the network topology and from the respective intermediate gradient data of each node in the column, the final gradient data; and broadcasting the final gradient data to each node in the plurality of nodes. with the replica gradient data obtained by the node comprises combining the gradient data from the preceding adjacent node of the node as the replica gradient data is streamed into the node.

* * * * *